(12) United States Patent
Xian et al.

(10) Patent No.: US 8,606,757 B2
(45) Date of Patent: Dec. 10, 2013

(54) STORAGE AND RETRIEVAL OF CONCURRENT QUERY LANGUAGE EXECUTION RESULTS

(75) Inventors: Yuqiang Xian, Shanghai (CN); Qian Qian, Shanghai (CN); Jianhui Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 846 days.

(21) Appl. No.: 12/059,823

(22) Filed: Mar. 31, 2008

(65) Prior Publication Data

US 2009/0248650 A1    Oct. 1, 2009

(51) Int. Cl.
*G06F 7/00* (2006.01)
*G06F 17/00* (2006.01)
*G06F 17/30* (2006.01)

(52) U.S. Cl.
USPC ............................. 707/667; 707/769; 707/813

(58) Field of Classification Search
None
See application file for complete search history.

(56) References Cited

U.S. PATENT DOCUMENTS

| | | | |
|---|---|---|---|
| 7,107,282 B1 * | 9/2006 | Yalamanchi | 707/754 |
| 7,281,018 B1 * | 10/2007 | Begun et al. | 1/1 |
| 7,469,837 B2 * | 12/2008 | Mizushima | 235/492 |
| 7,519,577 B2 * | 4/2009 | Brundage et al. | 1/1 |
| 2006/0277170 A1 * | 12/2006 | Watry et al. | 707/3 |
| 2007/0233655 A1 * | 10/2007 | Engels | 707/3 |
| 2007/0271242 A1 * | 11/2007 | Lindblad | 707/3 |
| 2007/0296729 A1 * | 12/2007 | Du et al. | 345/559 |

* cited by examiner

*Primary Examiner* — Susan Chen
(74) *Attorney, Agent, or Firm* — Schwabe, Williamson & Wyatt, P.C.

(57) ABSTRACT

Methods, systems, and articles for receiving, by a computing device, execution results of a plurality of query language expressions are described herein. In various embodiments, the plurality of query language expressions may be concurrently executed, and the receiving may be contemporaneous with production of the execution results. Also, in various embodiments, the computing device may store a result item of the execution results for at least a first of the query language expressions in a memory block allocated exclusively for the first of the query language expressions while the first of the query language expressions is being executed, or in a result handle associated with the first of the query language expressions.

19 Claims, 6 Drawing Sheets

STORAGE AND RETRIEVAL OF CONCURRENT QUERY LANGUAGE EXECUTION RESULTS

TECHNICAL FIELD

Embodiments relate to the field of data processing, in particular, to efficient storing and retrieving of execution results of concurrently processed query language expressions.

BACKGROUND

Simultaneous execution of processes has become increasingly common. This has allowed for more efficient evaluation of multiple query language expressions, such as XPath expressions. Previously, such expressions had to be executed serially, with the thread executing the expressions making one pass through of a document for each expression. Thus, evaluation of a large collection of expressions could be time consuming. Simultaneous execution of the expressions, on the other hand, requires only a single traversal of a document for all of the expressions, allowing for evaluation of such expressions with greater efficiency.

The collective execution results of such simultaneously executed query language expressions are often stored in a stack or some other similar data structure, with portions of execution results of the multiple expressions being interleaved together. For example, if the results of a first expression are 1, 2, 3 and a second are A, B, C, they may be stored as 1, A, B, 2, 3, C. To retrieve results of any one expression, then, often requires substantial post-processing and review of the entire stack. Such post-processing is unnecessarily time consuming and reduces the advantage of simultaneous execution of multiple expressions.

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments include, but are not limited to, methods and apparatuses for receiving, by a computing device, execution results of a plurality of query language expressions. In various embodiments, the plurality of query language expressions may be concurrently executed, and the receiving may be contemporaneous with production of the execution results. Also, in various embodiments, the computing device may store a result item of the execution results for at least a first of the query language expressions in a memory block allocated exclusively for the first of the query language expressions while the first of the query language expressions is being executed, or in a result handle associated with the first of the query language expressions.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
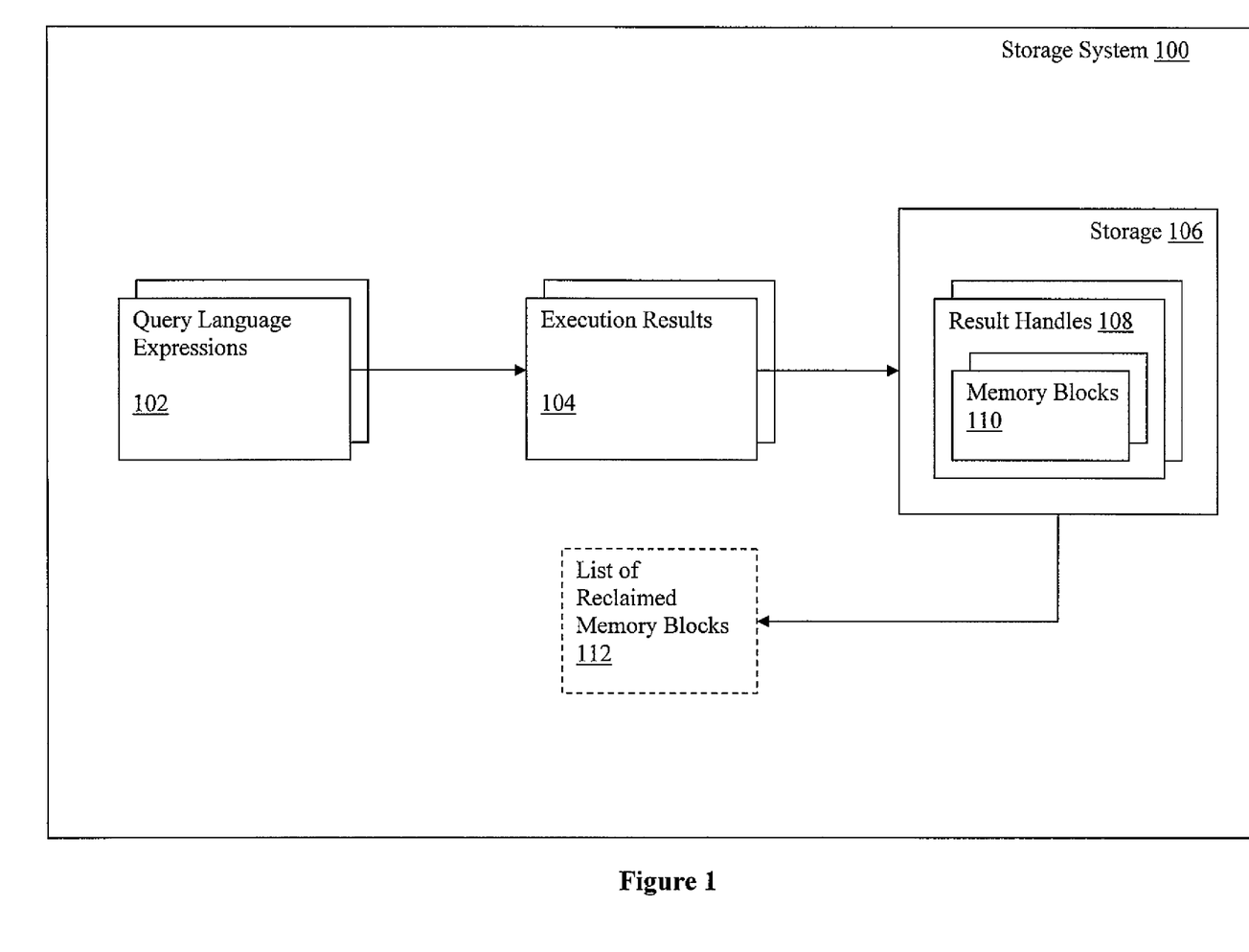
FIG. 1 illustrates an overview of various embodiments of the disclosure.

FIG. 1 illustrates an overview of various embodiments of the disclosure. As illustrated, a storage system 100 may include a plurality of query language expressions 102 being concurrently or simultaneously executed (hereinafter, "concurrently executed" refers to concurrent and/or simultaneous execution) by a plurality of processors of one or more computing devices (such as the computing device illustrated in FIG. 6). The query language expressions 102 may concurrently query the same document and retrieve portions of the document (or different documents). The retrieved portions may then comprise the execution results 104 of storage system 100. In various embodiments, the computing device(s) executing the query language expressions 102 may store their execution results 104 in storage 106 of storage system 100 contemporaneously with the production of the results 104. Thus, storage of a result 104 of a single expression 102 may begin before that expression has completed execution and may continue intermittently or continuously while the expression 102 executes.

As illustrated, storage 106 may comprise a plurality of result handles 108, some or all of result handles 108 each pointing to one or more memory or storage blocks 110 (hereinafter, "memory blocks 110"). As a portion of a result 104 for an expression 102 is first produced, logic associated with storage 106 may create a result handle 108 for that expression 102. If the portion is small and comprises the entire result 104, the result 104 may be stored in the result handle 108. If not, the logic associated with storage 106 may allocate a memory block 110 and set the result handle to point to the memory block 110. If, as storage continues, the memory block 110 becomes filled, the logic associated with storage 106 may allocate an additional memory block 110 and set the last allocated existing memory block 110 to point to the new memory block 110, creating a linked list of memory blocks 110 for results 104 of an expression 102.

In various embodiments, storage system 100 may support dual reclamation models for the results 104 stored in storage 106. In a first model (hereinafter "stack lifetime"), all results 104 may be reclaimed from storage 106 simultaneously or substantially simultaneously. In a second model (hereinafter "global lifetime"), results 104 for a single expression 102 or for a portion of such results 102 (such as result items of one memory block 110) may be reclaimed individually. After being reclaimed, the memory blocks corresponding to the reclaimed results 104/result items may be placed on a list of reclaimed memory blocks 112 of storage system 100. Memory blocks listed on list 112 may be reused by logic associated with storage 106, in some embodiments.

Figure 6:
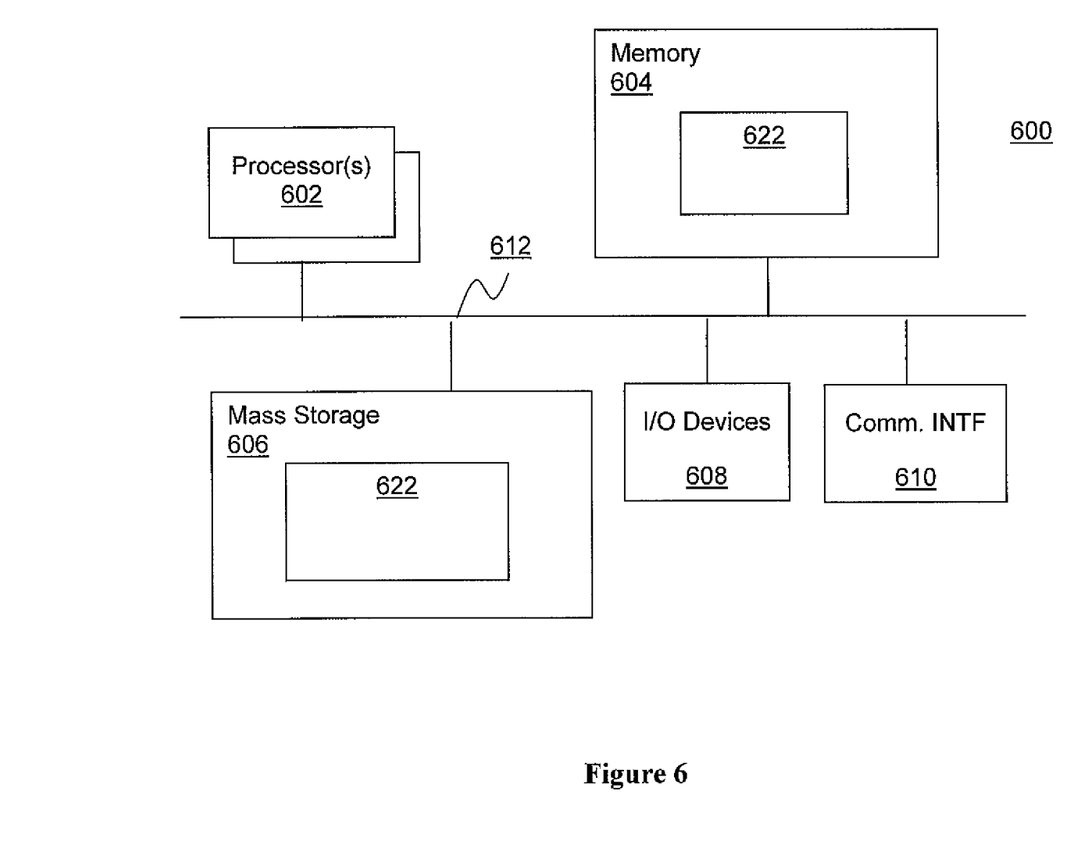
FIG. 6 illustrates an example computer system suitable for use to practice aspects of various embodiments.

In various embodiments, the computing device(s) (not shown) implementing storage system 100 may be any sort of computing device(s) known in the art, except for logic (not shown), such as instructions 622 (described in greater detail herein), other logic adapted to perform the operations described more fully herein, and storage of the computing device(s), such as storage 106. The computing device(s) may be personal computers (PC), workstations, servers, routers, mainframes, modular computers within blade servers or high-density servers, personal digital assistants (PDA), entertainment centers, set-top boxes, or mobile devices. An exemplary computing device is illustrated by FIG. 6, and will be described in greater detail herein.

In some embodiments, storage system 100 may be implemented on separate, remotely disposed computing devices. In various embodiments, where computing devices of storage system 100 are remotely disposed from each other, the computing devices may be communicatively connected to each other. In some embodiments, the computing devices may be connected by a networking fabric (not illustrated). Such a networking fabric may include one or more of a local area network (LAN), a wide area network (WAN), and the Internet, as is known in the art. In one embodiment, the networking fabric may comprise a private network or a virtual private network (VPN) which may utilize tunneling.

In various embodiments, query language expressions 102 may be any sort of expressions known in the art. In some embodiments, query language expressions 102 may be XPath expressions for extracting portions of a document, such as an Extensible Markup Language (XML) document. Further, the query language expressions 102 may comprise a collection of expressions that a user or program wishes to evaluate. As noted above, such expressions 102 may be concurrently executed by one or more processors of computing device(s) of storage system 100. In one embodiment, the collection of expressions may belong to an Extensible Stylesheet Transformations Language (XSLT) document, or the like.

As illustrated, concurrently executed expressions 102 may produce execution results 104. Because expressions 102 are concurrently executed, results 104 may be produced in an interleaved manner over time. For example, if three expressions 102, such as expressions A, B, and C, each produce results 104 (such as A1, A2, and A3 for A; B1, B2, and B3 for B; and C1, C2, and C3 for C), the results 104 may be produced in the following order (or in any alternative order): B1, C1, C2, A1, B2, A2, C3, A3, and B3. In various embodiments, each item or portion of a result 104 for an expression 102 may be a fragment of an XML, HyperText Markup Language (HTML), or like document.

In various embodiments, storage 106 may be any sort of storage, such as database(s) or file(s) stored in a storage device or devices, such as system memory 604 or mass storage 606 (illustrated in FIG. 6), except for result handles 108, memory blocks 110, and any logic associated with storage 106.

Figure 4:
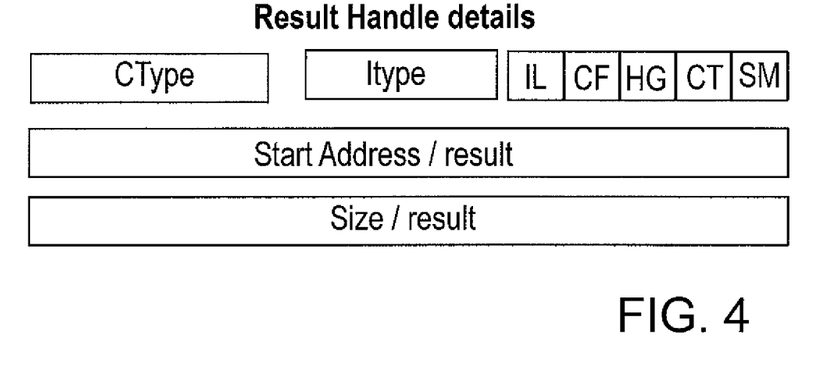
FIG. 4 illustrates elements of a result handle of various embodiments.

In some embodiments, logic associated with storage 106 may store results 104 contemporaneously with their production. Returning to the above example, this means that logic associated with storage 106 may store result B1 before C1 is produced, and C2 before A1 is produced. In various embodiments, the logic associated with storage 106 is configured to recognize expressions 102 and to create/allocate a result handle 108 for each executing expression 102 as results 104 for each expression are first produced. An exemplary result handle is shown in FIG. 4 and described in greater detail below. In some embodiments, result handles 108 may store metadata describing results 104 of their corresponding expressions 102. Such metadata may include a homogenous type (such as string) to which all items of results 104 for an expression 102 belong, a type of a homogenous context which applies to all results 104 for an expression 102, and/or indicators of whether results 104 are inlined (i.e., stored in the result handle 108), whether the results 104 have a homogenous type or are heterogeneous, whether the results 104 include a result context, whether results 104 are stored in one memory block 110 or multiple memory blocks 110, and/or whether results 104 are associated with a first or a second reclamation model (i.e., with a stack lifetime or a global lifetime). In various embodiments, result handles 108 may either store results 104 inline or include additional fields specifying a memory location of a first of the memory blocks 110 pointed to by the result handles and a size/number of items of results 104 stored in the memory blocks 110.

In various embodiments, the metadata stored in result handles 108 may be acquired by the logic associated with storage 106 in a number of ways. In one embodiment, the query language expressions 102 may include characteristics or values describing the results 104 they are to produce. In such an embodiment, upon first recognizing an executing expression 102 and creating/allocating its result handle 108, the logic associated with storage 106 may read the characteristics/values and set various fields of the result handle 108 to those characteristics/values. In another embodiment, the logic associated with storage 106 may determine the metadata for an expression 102 as the expression 102 executes.

In some embodiments, the logic associated with storage 106 may store a first result item/portion 104 for an expression 102 within the result handle 108. Upon receiving an additional item/portion of results 104 which, when combined with the first item 104, exceeds the available memory for the result handle 108, the logic associated with storage 106 may reserve a memory block 110 and store the first and additional result items/portions 104 in the memory block 110. The portion of the result handle 108 formerly storing the results 104 may then be set to point to the memory location/address of the memory block 110 and to count the number of result items/portions 104 stored for the expression 102 corresponding to the result handle 108.

Figure 3:
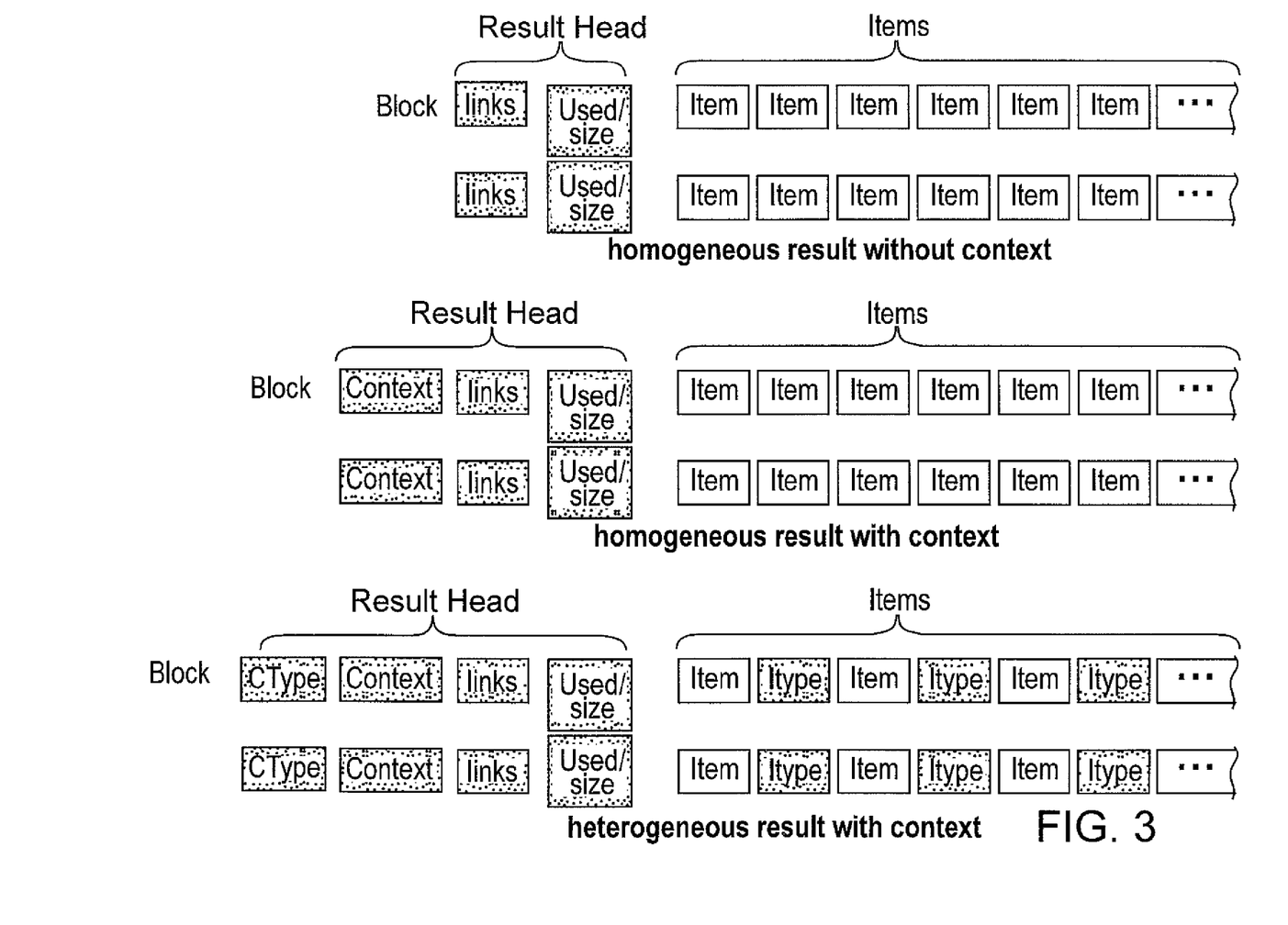
FIG. 3 illustrates a diagram of memory blocks of various embodiments.

In various embodiments, as mentioned above, each resource handle 108 may point to one or more memory blocks 110. As illustrated in FIG. 3, and described further below, each memory block may comprise a header portion and a series of result items 104. In some embodiments, the header portion may include a link to a subsequent memory block 110, a size of the memory block 110 to which it belongs, a context for the memory block 110, and/or a context type. The series of result items 104 may comprise simply the result items 104, if they belong to a homogenous type, or the result items 104 and their corresponding item types, if the results 104 are heterogeneous. If comprising both the items 104 and their corresponding types, each type may be stored contiguously with its corresponding item 104.

In some embodiments, upon receiving additional result items/portions 104 for an expression 102, the logic associated with storage 106 may determine if there is sufficient room in the memory block(s) 110 that have been reserved for that expression 102 to store the additional result item 104. If there is not sufficient room, the logic may reserve a new memory block 110 and set the most recently reserved memory block 110 for the expression to point to the new memory block 110, thereby creating a linked list of memory blocks 110. In another embodiment, if there is not sufficient room and there is free space in storage 106 that is in conjunction with memory block 110, the logic may grow itself instead of reserving a new memory block 110. If there is sufficient room, then the logic may simply store the result item 104 in the existing memory blocks 110. In various embodiments, the logic associated with storage 106 may repeat the determining, reserving and storing operations for an expression 102 until the expression has finished producing results.

In various embodiments, as mentioned above, memory blocks 110 may store a context for results 104 of a query language expression 102. In some embodiments the context may indicate that results 104 for an expression 102 are context sensitive or that they are going to be filtered according to the context. For example, for the following expression 102, "a[1]/d", all of the child elements 'd' for the elements 'a' may be collected during processing of the expression 102. The "[1]" fragment of the expression 102, however, may indicate that only child elements of the first element 'a' are valid results. Thus, the "[1]" fragment may be considered a context and stored with the memory blocks 110 to facilitate filtering when the results 104 are reclaimed. In some embodiments, the logic associated with storage 106 may be configured with rules for detecting and storing result contexts.

Figure 2:
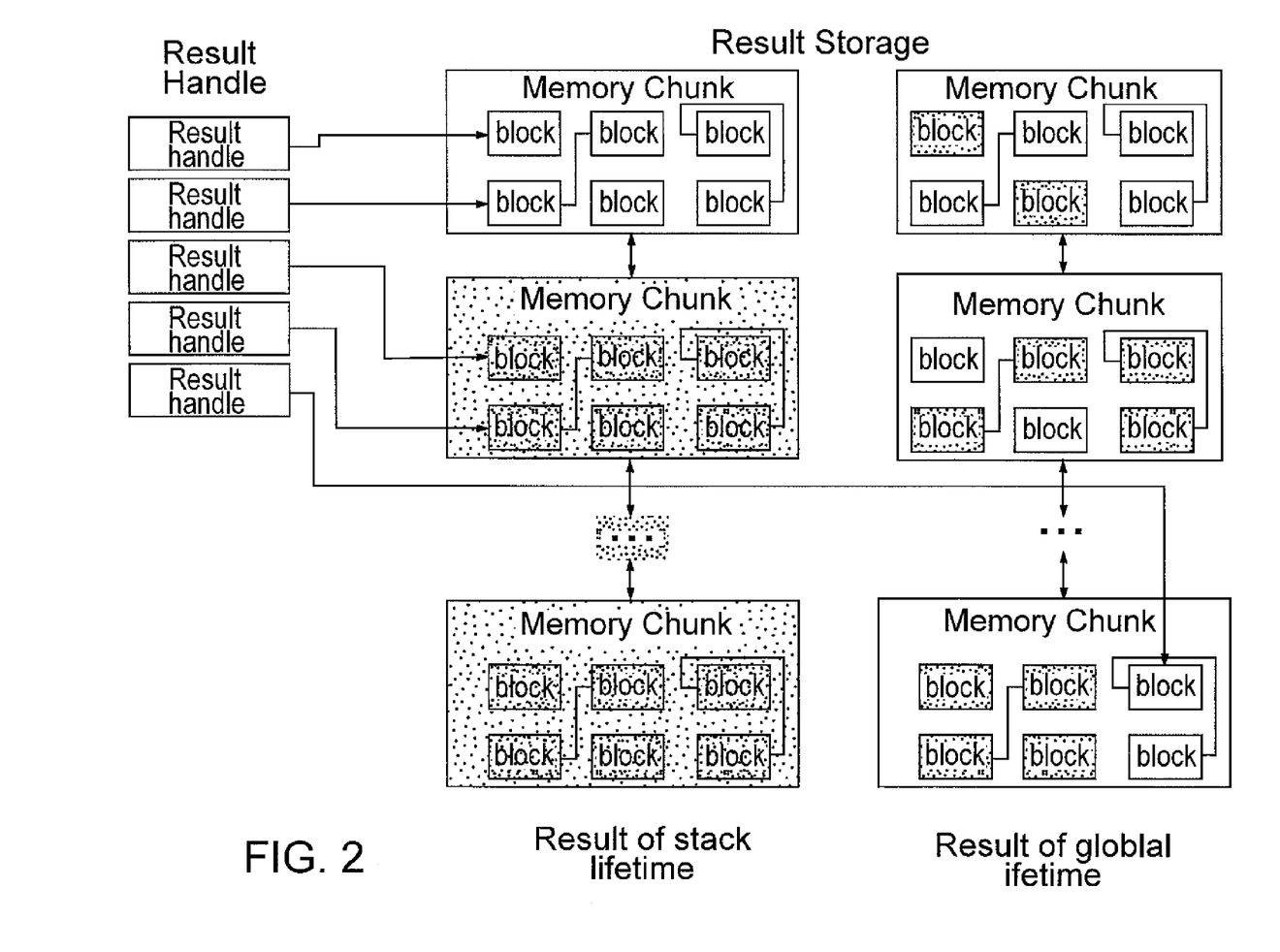
FIG. 2 illustrates dual reclamation models of various embodiments.

In various embodiments, logic associated with storage 106 may support dual models for reclaimed results 104 from storage 106, such as the stack lifetime and global lifetime mentioned above. FIG. 2 illustrates these two models in greater detail. In some embodiments, as discussed above, the result handle for each expression 102 may include an indication of which of the models the results 104 of the expression 102 should be associated with.

In some embodiments, each expression 102 belonging to a collection, such as a collection of an XSLT, will be considered as belonging to a stack lifetime. For results 104 associated with a stack lifetime, the results 104 may be reclaimed from storage 106 simultaneously or substantially simultaneously. In a stack lifetime model, the results 104 may reside in a logically continuous memory area of storage 106 and thus can be reclaimed with a single operation, such as bumping a pointer. Thus, rather than reclaiming results 104 serially, in an expression-by-expression fashion, all results 104 belonging to a collection of expressions 102 and having their result handles 108 indicating a stack lifetime may be reclaimed at the same time, or contemporaneously.

In various embodiments, if it is desirable for results 104 to be reclaimed one expression 102 at a time, the global lifetime may be used. When using the global lifetime, results 104 for a single expression 102 or for a portion of such results 102 (such as result items of one memory block 110) may be reclaimed individually. That is, results 104 stored in some or all memory blocks for an expression 102 may be reclaimed at the same time, allowing for expression-by expression retrieval, or even retrieval of simply a portion of the results 104 for an expression 102. After being reclaimed, the memory blocks corresponding to the reclaimed results 104/result items may be placed on a list of reclaimed memory blocks 112 of storage system 100. Memory blocks listed on list 112 may be reused by logic associated with storage 106, in some embodiments, and be reserved for results 104 of other expressions 102. In various embodiments, the list 112 may be any sort of data structure known in the art, except for its contents, and may or may not be part of storage 106.

FIG. 2 illustrates dual reclamation models of various embodiments. As illustrated, a plurality of result handles point to linked lists of memory blocks, the blocks themselves being part of larger memory chunks. Further, the memory chunks are shown in FIG. 2 as being associated with a result lifetime of one of two models: a stack lifetime model and a global lifetime model. In various embodiments, the result handles of the query language expressions may contain values for identifying the model or models to which the results of those expressions belong. As mentioned above, in one embodiment, the query language expressions may comprise a collection of XPath expressions of an XSLT. In such an embodiment, each result handle of each expression of the collection may have its value set to indicate that the result lifetime of the results is a stack lifetime. For such results belonging to a stack lifetime model, all blocks of memory may be reclaimed at the same time (or at approximately the same time). Thus, as illustrated, all blocks in the left memory chunks may be reclaimed at the same time.

In various embodiments, a result handle may instead indicate that the results of a query language expression have a global lifetime. If result items of a memory block having a global lifetime are reclaimed, those blocks may be placed on a list of reclaimed memory blocks, as discussed above. The memory blocks corresponding to the listed memory blocks may then be reused, but the reclaimed memory blocks may not be cleared of their contents until they are reused. In FIG. 2, memory blocks corresponding to listed, reclaimed memory blocks are shown in a darker gray than the other memory blocks.

FIG. 3 illustrates a diagram of memory blocks of various embodiments. In FIG. 3, three sets of memory block are shown, each set including two memory block. In the first set, a homogenous result without a result context is illustrated. In such a result, each block storing the result may include a result head/header portion and a series of result items. As mentioned above, each result item may have a uniform size, and each memory block or set of memory blocks may have a variable size. Also, as shown, each header portion may include links to other memory blocks and a memory block size. By allowing each block to store a reference to a block or blocks that it points to, a linked list of memory blocks can be created.

In the second set, a homogenous result with a result context is illustrated. As is shown, such memory blocks may be identical to the above described blocks without context, with the only addition being a context field to the header portion to store a result context.

In the third set, a heterogeneous result with a result context is illustrated. As illustrated, such memory blocks may include an additional result context type field (shown as "CType") in the header portion to indicate the type of the result context. Also, in various embodiments, a result item type (shown as "IType") for each result item may be stored contiguously with the result items. As mentioned above, if all result items have the same type (i.e., the result is homogenous), the type may be stored in the result handle (as shown in FIG. 4), thereby saving storage space.

FIG. 4 illustrates elements of a result handle of various embodiments. As illustrated, a result handle may include a number of fields to store metadata about an execution result of a specific query language expression. In some embodiments, the result handle may include a context type (shown as "CType") for the result context of the execution results if the results are homogenous. Also, in various embodiments, the result handle may include a type (shown as "IType") for the result items of the execution results if the results are homogenous.

As is further shown, the result handle may also include a number of flag fields. In various embodiments, a first of these fields (shown as "IL") may provide an indication of whether result items of a query language expression are stored in the result handle (i.e., "inlined"). In some embodiments, a second of these fields (shown as "CF") may provide an indication of whether the execution results of a query language expression include a result context. In further embodiments, a third of these fields (shown as "HG") may provide an indication of whether result items of a query language expression are homogenous or heterogeneous. In some embodiments, a fourth of these fields (shown as "CT") may provide an indication of a number of memory blocks (one or multiple) storing result items of a query language expression. In various embodiments, a fifth of these fields (shown as "SM") may provide an indication of a result lifetime for result items of a query language expression.

In various embodiments, as shown, the result handle may also include fields for a start address of the referenced memory blocks and/or a number of result items stored in the memory blocks. In some embodiments, these fields may also be used to store an execution result in the result handle when the execution result is small, as described above.

In some embodiments, the result handle may have only some or all of the fields shown, and the fields may be arranged in any order and possess any size.

Figure 5:
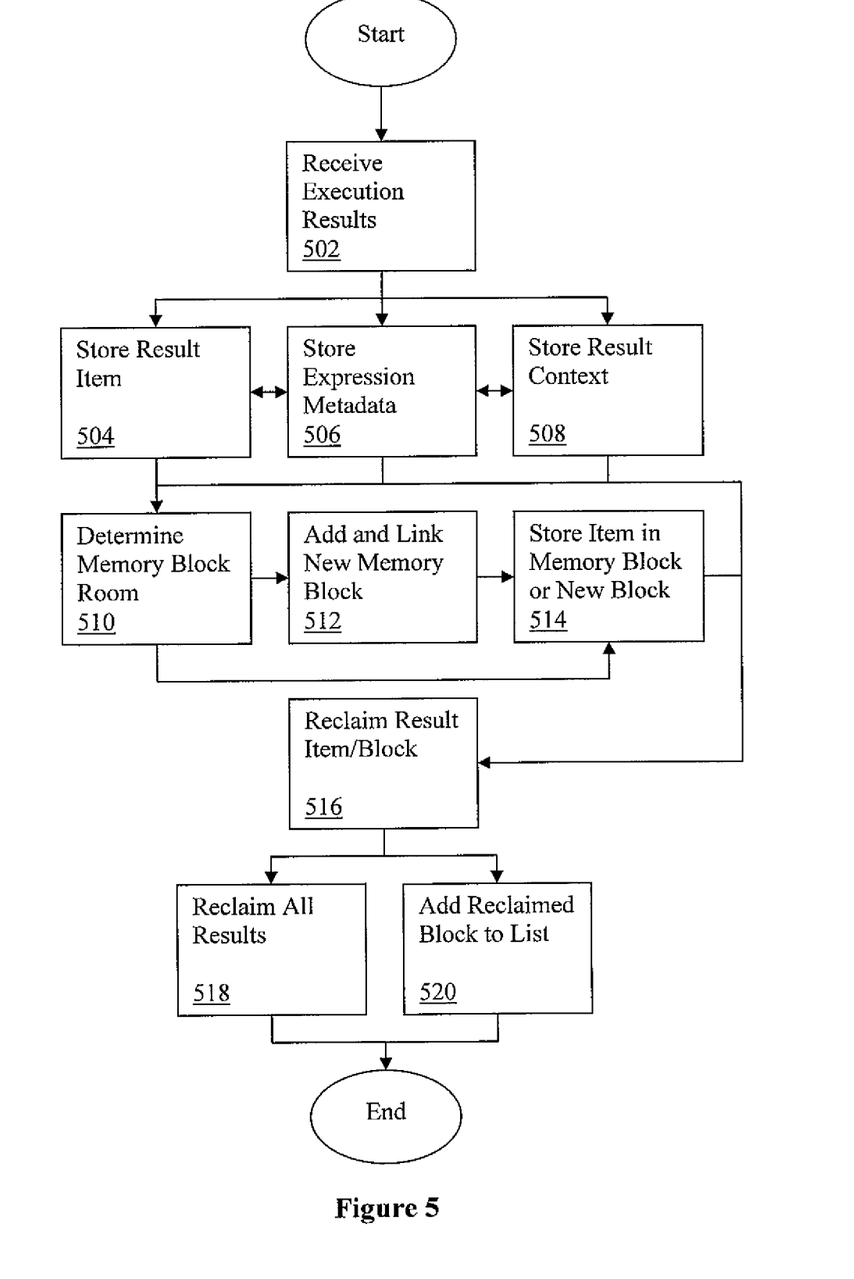
FIG. 5 illustrates a flow chart view of selected operations of the methods of various embodiments.

FIG. 5 illustrates a flow chart view of selected operations of the methods of various embodiments. As illustrated, a computing device may receive execution results of a plurality of query language expressions, block 502, the plurality of query language expressions being concurrently executed, and the receiving being contemporaneous with production of the execution results. In one embodiment, the query language expressions may be XPath expressions for extracting portions of an XML document. Upon receiving the results, the computing device may store a result item of the execution results for at least a first of the query language expressions in a memory block allocated exclusively for the first of the query language expressions while the first of the query language expressions is being executed, or in a result handle associated with the first of the query language expressions, block 504. In some embodiments, the computing device may store metadata about the first of the query language expressions and references to a linked list of memory blocks in the result handle, block 506, the memory blocks being employed for storing the result item. Further, in some embodiments, the computing device may store a context for result items of the first of the query language expressions in the memory block, block 508.

In various embodiments, each memory block may include a header portion, the header portion having at least one of links to other memory blocks, a memory block size, a result context, or a result context type. Also, in some embodiments, the metadata to be stored in the result handle may include at least one of an indication of a number of memory blocks storing result items of the first of the query language expressions,
an indication of a result lifetime for result items of the first of the query language expressions,
an indication of whether result items of the first of the query language expressions are homogenous or heterogeneous,
an indication of whether the execution results of a query language expression include a result context,
an indication of whether result items of the first of the query language expressions are stored in the result handle,
a type of result items of the first of the query language expressions,
a context type of result items of the first of the query language expressions,
a start address of the referenced memory blocks, or
a number of result items stored the memory blocks.

As is further illustrated, the computing device may then, in some embodiments, determine whether the memory block storing the result item includes room to store another result item of the execution results for the first of the query language expressions, block 510. If the memory block does not have room, the computing device may then add and link another memory block to the memory block or grow the memory block, block 512. In various embodiments, the computing device may then store the other result item in the memory block or the other memory block, block 514.

In various embodiments, the computing device may also reclaim the result item from the memory block or the result handle, block 516. If the first of the query language expressions is associated with a first result lifetime, the computing device may simultaneously reclaim the results of the plurality of query language expressions, block 518, the plurality of query language expressions forming a collection. Also, if the first of the query language expression is associated with a second result lifetime and if the computing device has reclaimed the memory block by reclaiming the result item and the other result items stored in the memory block, the computing device may add the reclaimed memory block to a list of reclaimed memory blocks, block 520.

FIG. 6 illustrates an example computer system suitable for use to practice aspects of various embodiments. As shown, computing system 600 includes a number of processors or processor cores 602, and system memory 604. For the purpose of this application, including the claims, the terms "processor" and "processor cores" may be considered synonymous, unless the context clearly requires otherwise. Additionally, computing system 600 includes mass storage devices 606 (such as diskette, hard drive, compact disc read only memory (CDROM), a disc storage device, and so forth), input/output devices 608 (such as display, keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing one or more aspects of the above described teachings to practice the various embodiments, herein collectively denoted as 622. The various components may be implemented by assembler instructions supported by processor(s) 602 or high-level languages, such as, for example, C, that can be compiled into such instructions.

The permanent copy of the programming instructions may be placed into permanent storage 606 in the factory, or in the field, through, for example, a distribution medium (not shown), such as a compact disc (CD), or through communication interface 610 (from a distribution server (not shown)).

That is, one or more distribution media having an implementation of the agent program may be employed to distribute the agent and program various computing devices.

The constitution of these elements 602-612 are known, and accordingly will not be further described.

In embodiments of the present invention, an article of manufacture (not illustrated) may be employed to implement one or more methods as disclosed herein. For example, in exemplary embodiments, an article of manufacture may comprise a storage medium and a plurality of programming instructions stored on the storage medium and configured to program an apparatus to reclaim a first result item associated with an execution of a first query language expression from a memory block or a result handle, concurrently with reclaiming at least one other result item associated with another execution of a second query language expression, the first and second query language expressions forming a collection, if the first query language expression is associated with a first result lifetime.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments. This application is intended to cover any adaptations or variations of the embodiments discussed herein. Therefore, it is manifestly intended that the embodiments be limited only by the claims and the equivalents thereof.

What is claimed is:

1. A method comprising:
   receiving, on a computing device, a plurality of execution results corresponding to a plurality of query language expressions, the plurality of query language expressions being concurrently executed against a document, and the receiving being contemporaneous with interleaved production of the plurality of execution results;
   creating, on the computing device, a plurality of result handles correspondingly associated with the plurality of query language expressions;
   storing, on the computing device, at least a first received portion of one of the plurality of execution results in one of the plurality of result handles associated with a corresponding one of the plurality of query language expressions, wherein said storing is contemporaneous with further production of at least a second portion of the one of the plurality of execution results;
   upon receiving the second portion of the one of the execution results, and in response to a determination of insufficient space for the second received portion, reserving a new memory block, on the computing device, setting a most recently reserved memory block to point to the new memory block, thereby creating a linked list of reserved memory blocks associated with the one of the plurality of results handles, and storing, the second portion of the one of the execution results in the new memory block; and
   storing metadata associated with the corresponding one of the plurality of query language expressions and references to the linked list of reserved memory blocks in the one of the plurality of result handles wherein said metadata includes at least an indication of whether result items of the corresponding one of the plurality of query language expressions are homogenous or heterogeneous.

2. The method of claim 1, wherein respective ones of the memory blocks include a header portion, the header portion having at least one of links to other memory blocks, a memory block size, a result context, or a result context type.

3. The method of claim 1, wherein said metadata further includes at least one of an indication of a number of memory blocks storing the one of the plurality of execution results, an indication of a result lifetime for result items of the corresponding one of the plurality of query language expressions, an indication of whether result items of the corresponding one of the plurality of query language expressions include a result context, an indication of whether result items of the corresponding one of the plurality of query language expressions are stored in the result handle, a type of result items of the corresponding one of the plurality of query language expressions, a context type of result items of the corresponding one of the plurality of query language expressions, a start address of the associated at least one of the plurality of memory blocks, or a number of result items stored in the memory blocks.

4. The method of claim 1, further comprising storing a context for the corresponding one of the plurality of query language expressions in the linked list of reserved memory blocks.

5. The method of claim 1, further comprising:
   determining whether the memory block storing the second portion of the one of the plurality of execution results includes space to store another portion of the one of the plurality of execution results; and
   in response to a determination of insufficient space in the memory block, linking another memory block.

6. The method of claim 5, further comprising storing the other portion of the one of the expression results in the other linked memory block.

7. The method of claim 1, further comprising reclaiming the memory blocks associated with the one of the plurality of result handles.

8. The method of claim 7, wherein the memory blocks belong to a memory chunk, and further comprising:
   reclaiming the memory blocks by reclaiming memory associated with the memory chunk, wherein the plurality of query language expressions belong to a collection of query language expressions associated with a result lifetime.

9. The method of claim 8, further comprising:
   in response to the one of the plurality of query language expressions being associated with a second result lifetime, reclaiming memory associated with the memory blocks individually; and
   adding the reclaimed memory blocks to a list of reclaimed memory blocks.

10. The method of claim 1, wherein the plurality of query language expressions are XPath expressions executed in parallel, wherein the document is an XML document.

11. The method of claim 1, further comprising setting one or more fields of the one of the plurality of result handles based on characteristics of the corresponding one of the plurality of query language expressions, wherein the one or more fields include an indication of a reclamation model.

12. A computing device comprising:
   one or more processors;
   a storage device coupled to at least one of the processors; and
   storage logic associated with the storage device, and the storage logic, when executed by at least one of the processors, configures at least one of the processors to:
      receive a plurality of execution results corresponding to a plurality of Xpath expressions, the plurality of Xpath expressions being concurrently executed against an XML document, and the receive being contemporaneous with interleaved production of the execution results, create a plurality of result handles correspondingly associated with the plurality of query language expressions from the storage device, store at least a first received portion of one of the plurality of execution results in one of the plurality of result handles associated with a corresponding one of the plurality of query language expressions, wherein said storing is contemporaneous with further production of at least a second portion of the one of the plurality of execution results;

upon receiving the second portion of the one of the execution results, and in response to a determination of insufficient space for the second received portion, reserve a new memory block, on the computing device, setting a most recently reserved memory block to point to the new memory block, to create a linked list of reserved memory blocks associated with the one of the plurality of results handles, and store the second portion of the one of the plurality of execution results in the new memory block; and store metadata associated with the corresponding one of the plurality of Xpath expressions and references to the linked list of reserved memory blocks in the one of the plurality of result handles wherein said metadata includes at least an indication of whether result items of the corresponding one of the plurality of query language expressions are homogenous or heterogeneous.

13. The computing device of claim 12, wherein respective ones of the memory blocks include a header portion, the header portion having at least one of links to other memory blocks, a memory block size, a result context, or a result context type.

14. The computing device of claim 12, wherein the metadata further includes at least one of an indication of a result lifetime for result items of the corresponding one of the plurality of Xpath expressions, an indication of whether result items of the corresponding one of the plurality of Xpath expressions include a result context, an indication of whether result items of the corresponding one of the plurality of Xpath expressions are stored in the result handle, a type of result items of the corresponding one of the plurality of Xpath expressions, a context type of result items of the corresponding one of the plurality of Xpath expressions, a start address of the linked list of reserved memory blocks, or a number of result items stored in the at least one of memory blocks.

15. The computing device of claim 12, wherein the memory blocks belong to a memory chunk, and wherein the storage logic further configures at least one of the processors to reclaim one or more memory blocks associated with the one of the plurality of the result handle from the memory chunk.

16. An article of manufacture comprising:
a non-transitory tangible computer-readable storage medium; and
a plurality of programming instructions stored on the storage medium and configured to program an apparatus, in response to execution of the instructions, to:

receive a plurality of execution results corresponding to a plurality of query language expressions, the plurality of query language expressions being concurrently executed against a document, and the receiving being contemporaneous with interleaved production of the plurality of execution results;

create a plurality of result handles correspondingly associated with the plurality of query language expressions;

store at least a first received portion of one of the plurality of execution results in one of the plurality of result handles associated with a corresponding one of the plurality of query language expressions, wherein said storing is contemporaneous with further production of at least a second portion of the one of the plurality of execution results; and upon receiving the second portion of the one of the execution results, and in response to a determination of insufficient space for the second received portion, reserving a new memory block, on the computing device, setting a most recently reserved memory block to point to the new memory block, thereby creating a linked list of reserved memory blocks associated with the one of the plurality of results handles, and store the second portion of one of the plurality of execution results in the new memory block; and store metadata associated with the corresponding one of the plurality of query language expressions and references to the linked list of reserved memory blocks in the one of the plurality of result handles wherein said metadata includes at least an indication of whether result items of the corresponding one of the plurality of query language expressions are homogenous or heterogeneous.

17. The article of claim 16, wherein the programming instructions are further configured to cause the apparatus, in response to execution of the programming instructions, to:
reclaim the at least one of the plurality of memory blocks individually in response to at least one of the plurality of query language expressions being associated with another result lifetime, and
add the reclaimed memory blocks to a list of reclaimed memory blocks.

18. The article of claim 16, wherein the programming instructions are further configured to cause the apparatus, in response to execution of the programming instructions, to:
store a context for respective ones of the execution results of the plurality of query language expressions in respective ones of the at least one of the plurality of memory blocks.

19. The article of claim 16, wherein the programming instructions are further configured to cause the apparatus, in response to execution of the programming instructions, to:
determine whether the new memory block storing one of the execution results includes space to store another one of the execution results for the one of the plurality of query language expressions, and
in response to a determination of insufficient space in, link another memory block to the memory block.

* * * * *

UNITED STATES PATENT AND TRADEMARK OFFICE
CERTIFICATE OF CORRECTION

| | | |
|---|---|---|
| PATENT NO. | : 8,606,757 B2 | Page 1 of 1 |
| APPLICATION NO. | : 12/059823 | |
| DATED | : December 10, 2013 | |
| INVENTOR(S) | : Xian et al. | |

It is certified that error appears in the above-identified patent and that said Letters Patent is hereby corrected as shown below:

In the Claims

Column 9
Line 55, "storing,..." should read --storing...--.

Column 12
Lines 59-60, "in response to a determination of the insufficient space in, link another memory block to the memory block." should read --in response to a determination of insufficient space in the new memory block, link another memory block to the memory block.--.

Signed and Sealed this
Fifth Day of May, 2015

Michelle K. Lee
*Director of the United States Patent and Trademark Office*